United States Patent
Regnier

(10) Patent No.: US 7,496,792 B2
(45) Date of Patent: Feb. 24, 2009

(54) REPEAT DIGITAL MESSAGE TRANSMISSION BETWEEN A MICROPROCESSOR MONITORING CIRCUIT AND AN ANALYZING TOOL

(75) Inventor: Laurent Regnier, Gieres (FR)

(73) Assignee: STMicroelectronics S.A., Montrouge (FR)

( * ) Notice: Subject to any disclaimer, the term of this patent is extended or adjusted under 35 U.S.C. 154(b) by 441 days.

(21) Appl. No.: 10/531,340

(22) PCT Filed: Oct. 15, 2002

(86) PCT No.: PCT/FR02/03526

§ 371 (c)(1),
(2), (4) Date: Apr. 14, 2005

(87) PCT Pub. No.: WO2004/036428

PCT Pub. Date: Apr. 29, 2004

(65) Prior Publication Data

US 2006/0013294 A1    Jan. 19, 2006

(51) Int. Cl.
*G06F 11/00* (2006.01)
(52) U.S. Cl. ........................................ 714/30
(58) Field of Classification Search ................ None
See application file for complete search history.

(56) References Cited

U.S. PATENT DOCUMENTS

| | | | |
|---|---|---|---|
| 5,050,168 A | * | 9/1991 | Paterson ....................... 714/35 |
| 5,237,684 A | | 8/1993 | Record et al. |
| 5,621,663 A | | 4/1997 | Skagerling |
| 5,883,905 A | * | 3/1999 | Eastburn ..................... 714/738 |
| 5,996,092 A | | 11/1999 | Augsburg et al. |
| 6,009,514 A | * | 12/1999 | Henzinger et al. .......... 712/236 |

(Continued)

FOREIGN PATENT DOCUMENTS

EP    1 184 790 A2    3/2002

(Continued)

OTHER PUBLICATIONS

International Search report from corresponding Intn'l Application No. PCT/FR02/03526, filed Oct. 15, 2002.

(Continued)

*Primary Examiner*—Michael C Maskulinski
(74) *Attorney, Agent, or Firm*—Lisa K. Jorgenson; James H. Morris; Wolf, Greenfield & Sacks, P.C.

(57) ABSTRACT

The invention concerns a method for transmitting digital messages through output terminals (22) of a monitoring circuit (18) incorporated in a microprocessor (12) during execution of a series of instructions, the digital messages representing characteristic data stored by the monitoring circuit upon detecting a specific event in the execution of the series of instructions, one of said data corresponding to an identifier of said specific event, said method comprising the following steps: comparing the data of the last two detected specific events having a common identifier, if the compared data are identical, incrementing a repeat counter associated with said specific event; and if the compared data are different, transmitting a digital message representing the data of the last detected specific event, and furthermore, if the content of the repeat counter associated with said specific event is other than zero, transmitting a digital message indicating a repeat of the specific event.

15 Claims, 1 Drawing Sheet

U.S. PATENT DOCUMENTS

| | | | | |
|---|---|---|---|---|
| 6,094,729 | A | * | 7/2000 | Mann .......................... 714/25 |
| 6,148,437 | A | * | 11/2000 | Shah et al. ................. 717/128 |
| 6,167,536 | A | | 12/2000 | Mann |
| 6,308,321 | B1 | * | 10/2001 | Schooler ..................... 717/132 |
| 6,332,117 | B1 | | 12/2001 | Berry et al. |
| 6,467,083 | B1 | | 10/2002 | Yamashita |
| 6,519,766 | B1 | | 2/2003 | Barritz et al. |

FOREIGN PATENT DOCUMENTS

| | | |
|---|---|---|
| JP | 61-282944 | 12/1986 |
| JP | 64-003748 | 1/1989 |
| JP | 2-244235 | 9/1990 |
| JP | 03-034039 | 2/1991 |
| JP | 07-262048 | 10/1995 |
| JP | 11-306044 | 11/1999 |

OTHER PUBLICATIONS

International Search report from related Intn'l Application No. PCT/FR02/03723, filed Oct. 29, 2002.

International Search report from related Intn'l Application No. PCT/FR02/03725, filed Oct. 29, 2002.

International Search report from related Intn'l Application No. PCT/FR02/03521, filed Oct. 15, 2002.

International Search report from related Intn'l Application No. PCT/FR02/03724, filed Oct. 29, 2002.

Plauger, D., *Real-Time Unix: Timing is Everything*, Mini Micro Systems, Cahners Publishing CY, Boston, vol. 22, No. 2, Feb. 1, 1989, pp. 72-76, XP000039292.

Okeeffe, H. et al., *Einheitliche Debug-Schnittstelle Der Zukunft Der Nexus-Standard Soll Die Kommunikation Zwischen Emulator Und Prozessor Vereinheitlichen*, Elektronik, Franzis Verlag GMBH, Munchen, vol. 49, No. 18, Sep. 5, 2000, pp. 124-128, XP001107530.

Macnamee, C., *Ein Interface Fuer Alle Nexus Als Globaler Debug-Standard*, Elektronikpraxis, Vogel, Wuerzburg, No. 3, Feb. 8, 2000, pp. 104-108, XP008001346.

Schmitt, W., *Nexus—Debug Konzept Der Zukunft? Universelle Emulations-Und Kalibrierschnittstelle Fuer Mikrocontroller*, Elektronik, Franzis Verlag GMBH, Munchen, vol. 48, No. 17, Aug. 24, 1999, pp. 52-59, XP000931028.

Nexis 5001 Forum: *Stardard for a Global Embeded Processor Debug Interface*, Dec. 15, 1999, IEEE-ISTO XP002247195.

The Nexus 5001 Forum™ Standard for a Global Embedded Processor Debug Interface, IEEE-ISTO 5001™, Dec. 15, 1999, Section 4, p. 13 and Section 6, pp. 51, 59, 65 and 67.

* cited by examiner

REPEAT DIGITAL MESSAGE TRANSMISSION BETWEEN A MICROPROCESSOR MONITORING CIRCUIT AND AN ANALYZING TOOL

BACKGROUND OF THE INVENTION

1. Field of the Invention

The present invention relates to the testing of microprocessors. It more specifically relates to a method and device of digital data transmission between a monitoring circuit integrated in a microprocessor chip and an analysis tool.

2. Related Art

FIG. 1 schematically shows an integrated circuit 10 comprising a microprocessor (µP) 12, an internal memory (MEM) 14, and input/output terminals (I/O) 16. Microprocessor 12 is intended to execute a program or a software stored in memory 14. Under control of the program, microprocessor 12 may process data provided by input/output terminals 16 or stored in memory 14 and read or write data through input/output terminals 16.

To check the proper operation of the microprocessor, a monitoring circuit 18 is generally integrated in integrated circuit 10. Monitoring circuit 18 is capable of reading specific data provided by microprocessor 12 on execution of a program, and of possibly processing the read data. Test terminals 22 connect monitoring circuit 18 to an analysis tool 24. Analysis tool 24 may process the received signals, for example, according to commands provided by a user, and ensure a detailed analysis of the operation of microprocessor 12. In particular, analysis tool 24 may determine the program instruction sequence really executed by microprocessor 12.

The number of test terminals 22 may be on the same order of magnitude as the number of input/output terminals 16, for example, from 200 to 400 terminals. Test terminals 22 as well as the connections of monitoring circuit 18 take up a significant silicon surface area, which causes an unwanted increase in the circuit cost. For this purpose, a first version of integrated circuit 10 comprising monitoring circuit 18 and test terminals 22 is produced in small quantities to debug the program of microprocessor 12 or "user program". After this debugging, a version of integrated circuit 10 without monitoring circuit 18 and of test terminals 22 is sold. This requires forming two versions of the integrated circuit, which requires a significant amount of work and is relatively expensive. Further, the final chip is not necessarily identical to the tested chip.

To overcome the above-mentioned disadvantages, it is desired to form a monitoring circuit 18 which takes up a reduced surface area and only requires a reduced number of test terminals 22, which decreases the cost of the monitoring circuit. Monitoring circuit 18 can then be left on the finally sold integrated circuit 10.

It is thus desired to decrease the number of signals provided by monitoring circuit 18. For this purpose, certain logic operations are directly performed at the level of monitoring circuit 18 on the data measured at the level of microprocessor 12 to only transmit messages having an important information content.

Thus, standard IEEE-ISTO-5001 in preparation provides1 in its 1999 version, accessible, for example, on website www.ieee-isto.org/Nexus5001, a specific message exchange protocol between a monitoring circuit and an analysis tool for a monitoring circuit 18 requiring but a reduced number of test terminals 22.

Among the messages provided by monitoring circuit 18 according to standard IEEE-ISTO-5001, a message indicates the occurrence of a jump in the program executed by microprocessor 12. A jump corresponds to the passing from an initial instruction of the program to a destination instruction other than the instruction which follows the initial instruction in the sequence of instructions forming the program. Based on the jump messages transmitted by monitoring circuit 18, analysis tool 24 reconstitutes the sequence of instructions executed by microprocessor 12. The sequence of reconstituted instructions can then be compared with a sequence of instructions theoretically executed by microprocessor 12 to determine malfunctions of microprocessor 12.

Standard IEEE-ISTO-5001 defines a jump message formed of a header identifying the type of jump from among different types of jumps detectable by the monitoring circuit and of an integer indicating the number of instructions executed by the microprocessor since the last transmission of a jump message and, if necessary of data representative of the destination instruction address.

A program executed by a microprocessor generally comprises loops, a loop corresponding to the repetition, a number of times, of a sequence of instructions, a jump being performed from the last instruction of the loop to the first instruction of the loop. In specific applications, especially in telephony, the program may comprise a significant number of loops of small size. As an example, the copying of the content of a memory may be performed by a loop containing a single instruction and that can be implemented, according to the used technologies, by one or two operation clock cycles of the microprocessor.

Current microprocessors currently operate at clock frequencies reaching 400 MHz. However, according to the technologies used, the maximum frequency of transmission of messages by monitoring circuit 18 on test terminals 22 is generally limited to some hundred megahertz. On execution of a loop of small size, the frequency at which messages representative of the loop jumps should be transmitted by monitoring circuit 18 on test terminals 22 may exceed the maximum transmission frequency. This results in a saturation of the monitoring circuit which can no longer provide messages properly.

Further, according to standard IEEE-ISTO-5001, monitoring circuit 18 can provide a message each time microprocessor 12 executes an instruction for reading data stored in memory 14 or an instruction for writing data into memory 14. Accordingly, when a loop of small size comprises a read or write instruction, monitoring circuit 18 must transmit, on test terminals 22, in addition to the messages representative of the loop jumps, messages representative of the read or write operations, which can increase the risks of saturation of monitoring circuit 18.

SUMMARY OF THE INVENTION

The present invention aims at a method and a circuit for transmitting digital messages, through output terminals of a monitoring circuit integrated to a microprocessor, indicating the occurrence of specific events on execution of the program by the microprocessor, and which does not exhibit the previously-mentioned disadvantage.

To achieve this and other objects, the present invention provides a method for transmitting digital messages through output terminals of a monitoring circuit integrated to a microprocessor on execution of an instruction sequence by the microprocessor, each digital message being representative of characteristic data stored by the monitoring circuit on detection of a specific event from among several specific events in the execution of the instruction sequence, one of said data corresponding to an identifier of said specific event, comprising the steps of comparing the characteristic stored data of the last two detected specific events corresponding to a same identifier; if the compared data are identical, incrementing a repetition counter associated with said specific event; and if the compared data are different, transmitting a digital message representative of the data characteristic of the last detected specific event and, further, if the content of the repetition counter associated with said specific event is different from zero, transmitting a digital message indicating a repetition of the specific event.

According to an embodiment of the present invention, the digital message indicating a repetition of the specific event comprises the content of the repetition counter associated with said specific event.

According to an embodiment of the present invention, the method further comprises the step of resetting the repetition counter associated with said specific event after transmission of a digital message indicating a repetition of the specific event.

According to an embodiment of the present invention, the characteristic data comprise the number of instructions executed by the microprocessor between the last two detected specific events.

According to an embodiment of the present invention, the specific event is a jump in the instruction sequence executed by the microprocessor.

According to an embodiment of the present invention, the characteristic stored data comprise data representative of the address of the destination instruction of the last detected jump.

According to an embodiment of the present invention, the specific event is a read or write instruction in the instruction sequence executed by the microprocessor.

According to an embodiment of the present invention, the method further comprises the steps of transmitting a digital message indicating a repetition of the specific event if the content of the repetition counter associated with said specific event is greater than a determined threshold; and setting the repetition counter associated with said specific event to zero.

The present invention also provides a device for transmitting digital messages between a monitoring circuit integrated to a microprocessor and an analysis tool, on execution of an instruction sequence by the microprocessor, comprising a means for detecting a specific event from among several specific events in the execution of the instruction sequence; a means for storing data characteristic of the detected specific event, one of said characteristic data corresponding to an identifier of the specific event; and a means for transmitting a digital message representative of the stored characteristic data, comprising a means for comparing stored characteristic data of the last two detected specific events corresponding to a same identifier; a means for incrementing a repetition counter associated with said specific event when the comparison means provides a signal indicating that the compared data are identical, the transmission means being capable of transmitting a message representative of the data characteristic of the last detected specific event when the comparison means provides a signal indicating that the compared data are different and, further, of transmitting a digital message indicating a repetition of the specific event when the incrementation means provides a signal indicating that the content of the repetition counter associated with said specific event is different from zero.

According to an embodiment of the present invention, the incrementation means is further capable of setting the repetition counter associated with said specific event to zero when the transmission means transmits a digital message indicating a repetition of the specific event.

BRIEF DESCRIPTION OF THE DRAWING

The foregoing object, features, and advantages of the present invention, as well as others, will be discussed in detail in the following non-limiting description of specific embodiments in connection with the accompanying drawings, among which.

DETAILED DESCRIPTION

Figure 1:
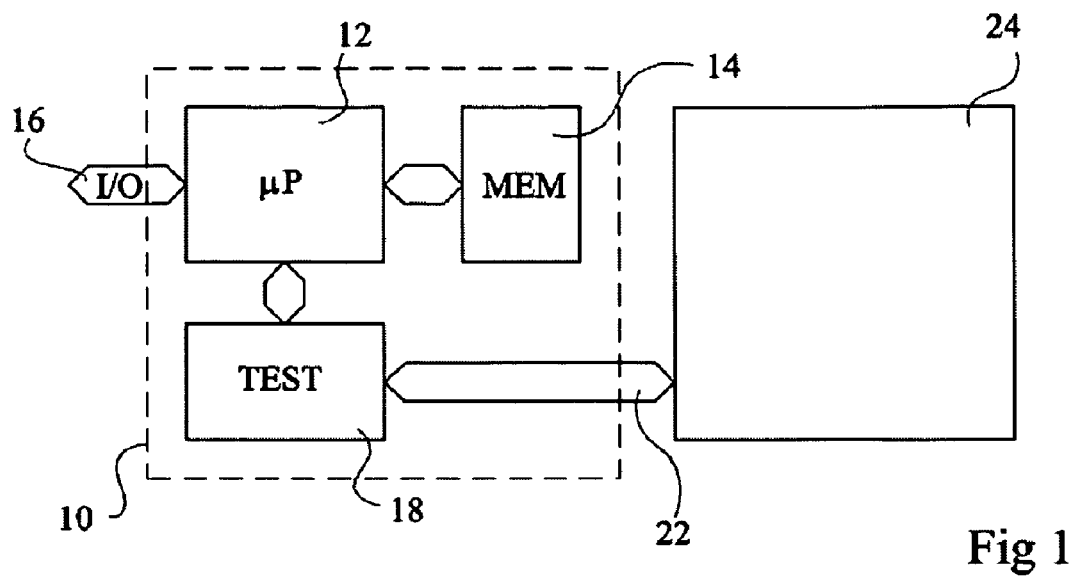
FIG. 1, previously described, very schematically shows the architecture of a chip integrating a microprocessor and a monitoring device.

The present invention relates to the transmission of digital messages between a monitoring circuit integrated to the chip of a microprocessor and an analysis tool, for example, according to an architecture similar to that of FIG. 1. Monitoring circuit 18 is capable of transmitting to analysis tool 24 different messages when specific events occur on execution of a program by microprocessor 12. The coding of the digital message may correspond to the coding described in standard IEEE-ISTO-5001. For example, monitoring circuit 18 transmits to analysis tool 24 a message indicating the detection of a jump in the execution of the program by microprocessor 12. A jump can be imposed by a specific instruction of the program or be caused by elements of the circuit of microprocessor 12. A repetition of the same instruction sequence of the program a number of times is, for example, obtained by a jump imposed by circuit elements of microprocessor 12. A jump may for example be systematically caused when microprocessor 12 receives an alert signal indicating a low charge level of the supply battery of circuit 10. Monitoring circuit 18 also transmits to the tool a message indicating the detection of a read or write operation on execution of the program by microprocessor 12. To determine the number of repetitions of a same message which should be provided by monitoring circuit 18 several times in a row, monitoring circuit 18 comprises a repetition counter initially set to 0 and associated with a specific message.

Figure 2:
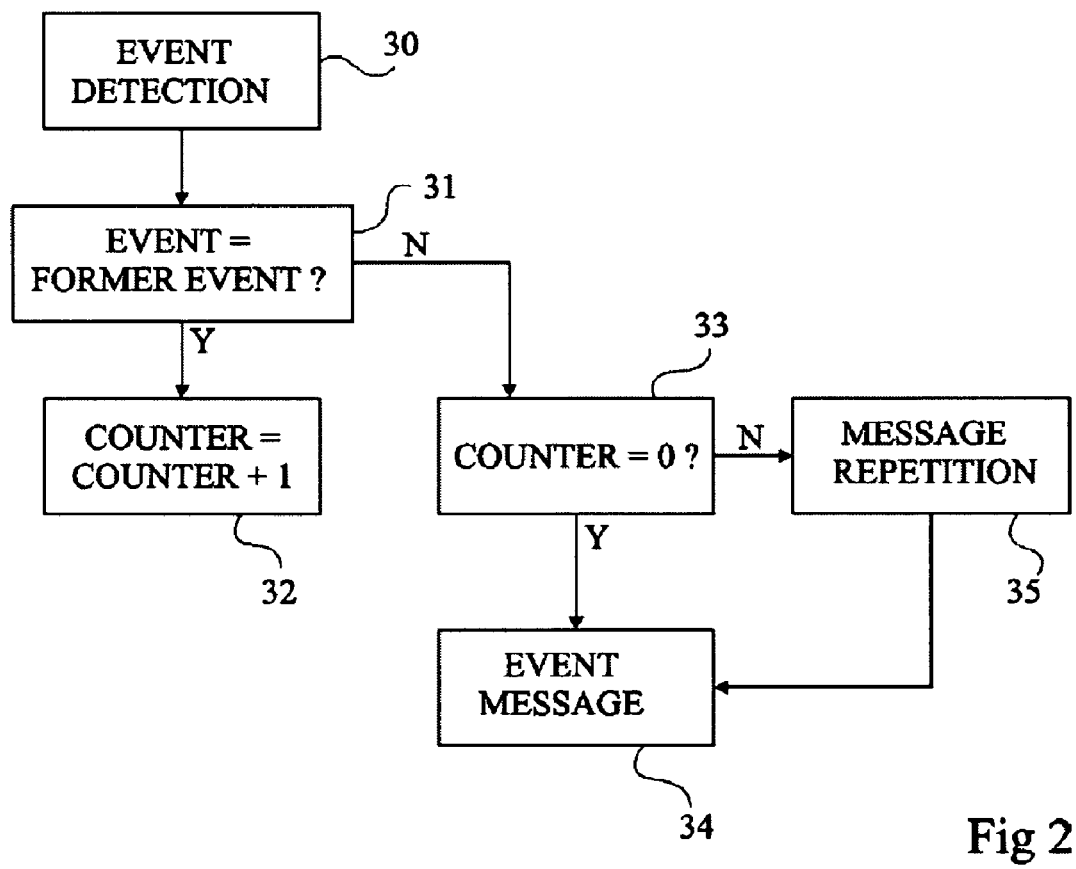
FIG. 2 shows in the form of a block diagram an example of implementation of the method of digital message transmission by the monitoring circuit according to the present invention.

FIG. 2 describes in the form of a block diagram an example of implementation of the method of digital message transmission between monitoring circuit 18 and analysis tool 24.

The digital message transmission method comprises, when the same message should be transmitted by monitoring circuit 18 several times in a row on execution of the program by microprocessor 12, of transmitting the message only once, and of transmitting a message indicating the number of repetitions of the message.

At step 30, monitoring circuit 18 has detected a specific event on execution of the program stored in memory 14 by microprocessor 12 which normally leads to the transmission of a message by monitoring circuit 18 to analysis tool 24. Monitoring circuit 18 then stores specific data characteristic of the detected event. In particular, in the case where the detected event is a jump, stored data correspond to an identifier of the detected jump type. Other stored data correspond to the number of instructions executed by microprocessor 12 between the detected jump and the previously-detected jump. Other stored data may correspond to the destination address of the jump. The storage of such data may be necessary to analysis tool 24, when the jump results from a jump instruction which controls a jump to a program instruction located at an address defined by a variable that can take different values. In the case where the detected event is a read or write operation, stored data correspond to an identifier indicating whether it is a read or write operation. Other stored data correspond to the value of the stored or read data. Other stored data may be representative of the address of an area of memory 14 where the data are stored or read. The method then carries on to step 31.

At step 31, monitoring circuit 18 compares the stored data characteristic of the event detected at step 30 with the stored data associated with the last detected event corresponding to the same identifier. The comparison is performed for data of same nature. As an example, when the event is a jump, the comparison is performed for example both on the number of instructions performed since the previously-detected jump, the destination address if available, etc. When the event is a read operation, the comparison is performed for example both on the value of the read data and the address of the memory area from which the data are read. If the last two events detected by the monitoring circuit having a same identifier are identical, the method carries on at step 32.

At step 32, monitoring circuit 18 increases the repetition counter associated with the event detected at step 30. No message is then transmitted to analysis tool 24.

If, at step 31, the last two detected events corresponding to a same identifier are not identical, the method carries on to step 33.

At step 33, monitoring circuit 18 checks whether the content of the repetition counter associated with the event detected at step 30 is equal to 0.If so, the method carries on to step 34.

At step 34, monitoring circuit 18 transmits to analysis tool 24 via test terminals 22 a message representative of the event detected at step 30. In the case where the detected event is a jump, the message may comprise in the concatenation of the stored characteristic data and comprise a header identifying the nature of the jump, the number of instructions performed since the preceding jump detection, the address of the jump destination instruction if available, etc.

If, at step 33, the content of the repetition counter associated with the event detected at step 30 is different from 0, the method carries on to step 35.

At step 35, monitoring circuit 18 transmits to analysis tool 24 via test terminals 22 a repetition message that may be formed, for example, of a header indicating that it is a repetition message and of the content of the repetition counter associated with the event detected at step 30. The repetition counter is then set back to 0 and the method carries on to step 34 at which monitoring circuit 18 provides analysis tool 24 with a message representative of the event detected at step 30.

The present invention enables reducing the number of digital messages transmitted by monitoring circuit 18 to analysis tool 24 when several events which would cause the transmission by the monitoring circuit of identical messages are successively detected by monitoring circuit 18. For example, the present invention thus enables, in the case of loops of small size where the frequency of jumps may become significant, maintaining the transmission frequency of digital messages on test terminals 22 under the maximum authorized transmission frequency.

According to a variation of the present invention, when at step 33, the repetition counter associated with a specific event reaches a threshold value, monitoring circuit 18 transmits a message especially comprising the threshold value of the repetition counter, followed by a message representative of the specific event, and resets the loop repetition counter to 0. This enables avoiding, for example in the case where a loop is repeated a significant number of times, that no message is transmitted to analysis tool 24 for too long a time period.

Of course, the present invention is likely to have various alterations, modifications, and improvements which will readily occur to those skilled in the art. For example, a repetition message may be used for certain specific events only, a message being specifically provided to the analysis tool by the monitoring circuit for the other events.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for transmitting digital messages through output terminals of a monitoring circuit integrated to a microprocessor on execution of an instruction sequence by the microprocessor, each digital message being representative of characteristic data stored by the monitoring circuit on detection of a specific event from a plurality of specific events in the execution of the instruction sequence, the method comprising:

comparing characteristic stored data of a specific event having an identifier with characteristic stored data of a last previously detected specific event having the same identifier to determine whether the specific event and the last previously detected specific event are identical;

when it is determined that the specific event and the last previously detected specific event are identical, incrementing a repetition counter associated with said specific event; and when it is determined that the specific event and the last previously detected specific event are different;

transmitting a digital message representative of the data characteristic of the specific event through at least one output terminal of the monitoring circuit; and, when content of the repetition counter associated with said specific event is different from zero, transmitting a digital message indicating a number of repetitions of the specific event, the number of repetitions is determined by a value of the repetition counter.

2. The method of claim 1, further comprising resetting the repetition counter associated wit said specific event after transmission of the digital message indicating a number of repetitions of the specific event.

3. The method of claim 1, wherein the characteristic data comprise a number of instructions executed by the microprocessor between the last two detected specific events.

4. The method of claim 1, wherein the specific event is a jump in the instruction sequence executed by the microprocessor and the last previously detected specific event has the same identifier in a last detected jump.

5. The method of claim 4, wherein the characteristic stored data of the specific event comprise data representative of an address of a destination instruction of the jump and the characteristic stored data of the last previously detected specific event comprise data representative of an address of a destination instruction of the last detected jump.

6. The method of claim 1, wherein the specific event is a read or write instruction in the instruction sequence executed by the microprocessor.

7. The method of claim 1, further comprising:
transmitting a digital message indicating a repetition of the specific event if the content of the repetition counter associated with said specific event is greater than a determined threshold; and
setting the repetition counter associated with said specific event to zero.

8. A device for transmitting digital messages between a monitoring circuit integrated with a microprocessor and an analysis tool, on execution of an instruction sequence by the microprocessor, comprising:
means for detecting a specific event from a plurality of specific events in the execution of the instruction sequence, the specific event having an identifier;
means for storing data characteristic of the detected specific event;
means for transmitting a digital message representative of the stored characteristic data;
means for comparing the characteristic data of the detected specific event with characteristic stores data of a last previously detected specific event having the same identifier to determine whether the detected specific event and the last previously detected specific event are identical; and
means for incrementing a repetition counter associated with said detected specific event and indicating a number of repetitions of the detected specific event when the comparison means provides a signal indicating that the detected specific event and the last previously detected specific event are identical;
wherein the transmission means is configured to:
transmitting, through at least one output terminal of the monitoring circuit, a message representative of the data characteristic of the detected specific event when the comparison means provides a signal indicating that the detected specific event and the last previously detected specific event are different; and
transmitting a digital message indicating a repetition of the detected specific event when the incrementation means provides a signal indicating that content of the repetition counter associated with said detected specific event is different from zero.

9. The device of claim 8, in which the incrementation means is further capable of setting the repetition counter associated with said specific event to zero when the transmission means transmits a digital message indicating a repetition of the specific event.

10. The device of claim 8, wherein the digital message indicating the repetition of the detected specific event comprises the content of the repetition counter associated with said specific event.

11. The device of claim 8, further comprising means for resetting the repetition counter associated with the detected specific event after transmission of the digital message indicating the repetition of the specific event.

12. The device of claim 8, wherein the characteristic data comprise the number of instructions executed by the microprocessor between the last two detected specific events.

13. The device of claim 8, wherein the detected specific event is a jump in the instruction sequence executed by the microprocessor and the last previously detected specific event corresponding to the same identifier in a last detected jump.

14. The device of claim 13, wherein the characteristic stored data of detected the specific event comprise data representative of an address of a destination instruction of the jump and the characteristic stored data of the last previously detected specific event comprise data representative of an address of a destination instruction of the last detected jump.

15. The device of claim 8, wherein the specific event is a read or write instruction in the instruction sequence executed by the microprocessor.

* * * * *

UNITED STATES PATENT AND TRADEMARK OFFICE
CERTIFICATE OF CORRECTION

PATENT NO. : 7,496,792 B2 Page 1 of 1
APPLICATION NO. : 10/531340
DATED : February 24, 2009
INVENTOR(S) : Laurent Regnier It is certified that error appears in the above-identified patent and that said Letters Patent is hereby corrected as shown below:

Col. 1, line 13, should read:
2. Discussion of the Related Art line 60, should read:
Thus, standard IEEE-ISTO-5001 in preparation provides Signed and Sealed this Fourteenth Day of April, 2009

JOHN DOLL
*Acting Director of the United States Patent and Trademark Office*